Jan. 9, 1940.　　　J. A. WEBB ET AL　　　2,186,776
BELT MAKING MACHINE
Filed Aug. 19, 1937　　　5 Sheets-Sheet 1
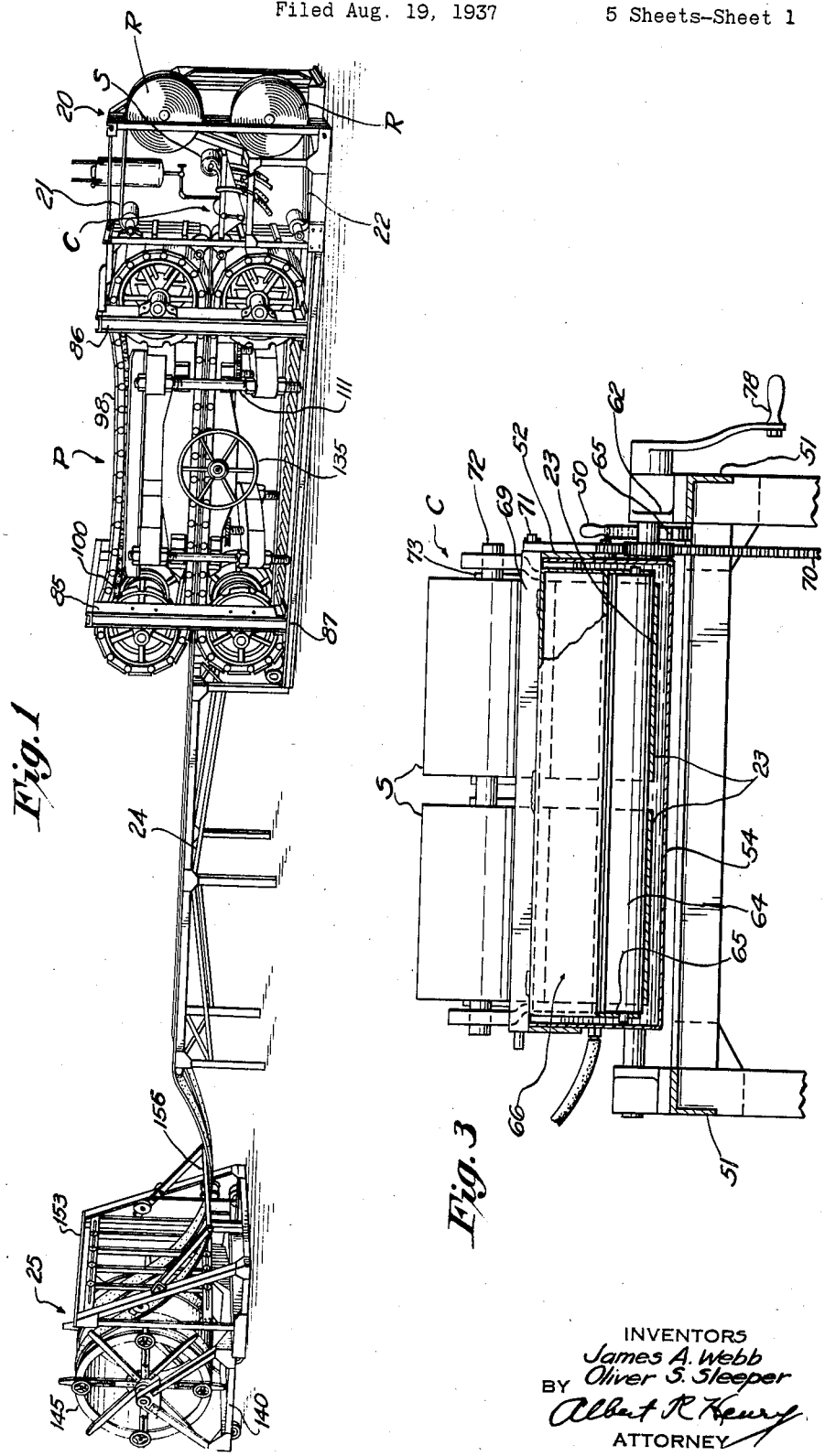
INVENTORS
James A. Webb
Oliver S. Sleeper
BY
Albert R. Henry
ATTORNEY

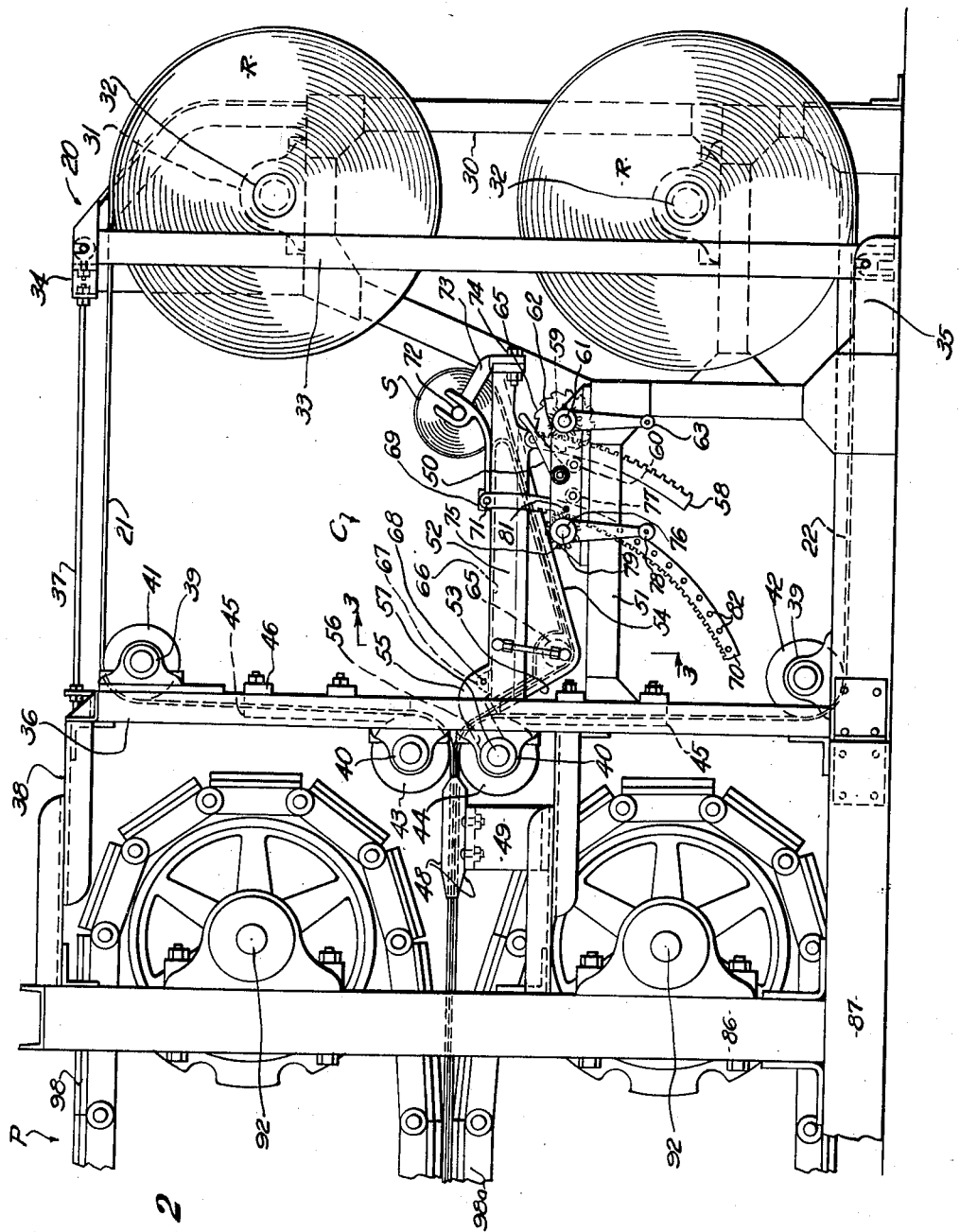

Jan. 9, 1940.    J. A. WEBB ET AL    2,186,776
BELT MAKING MACHINE
Filed Aug. 19, 1937    5 Sheets-Sheet 3
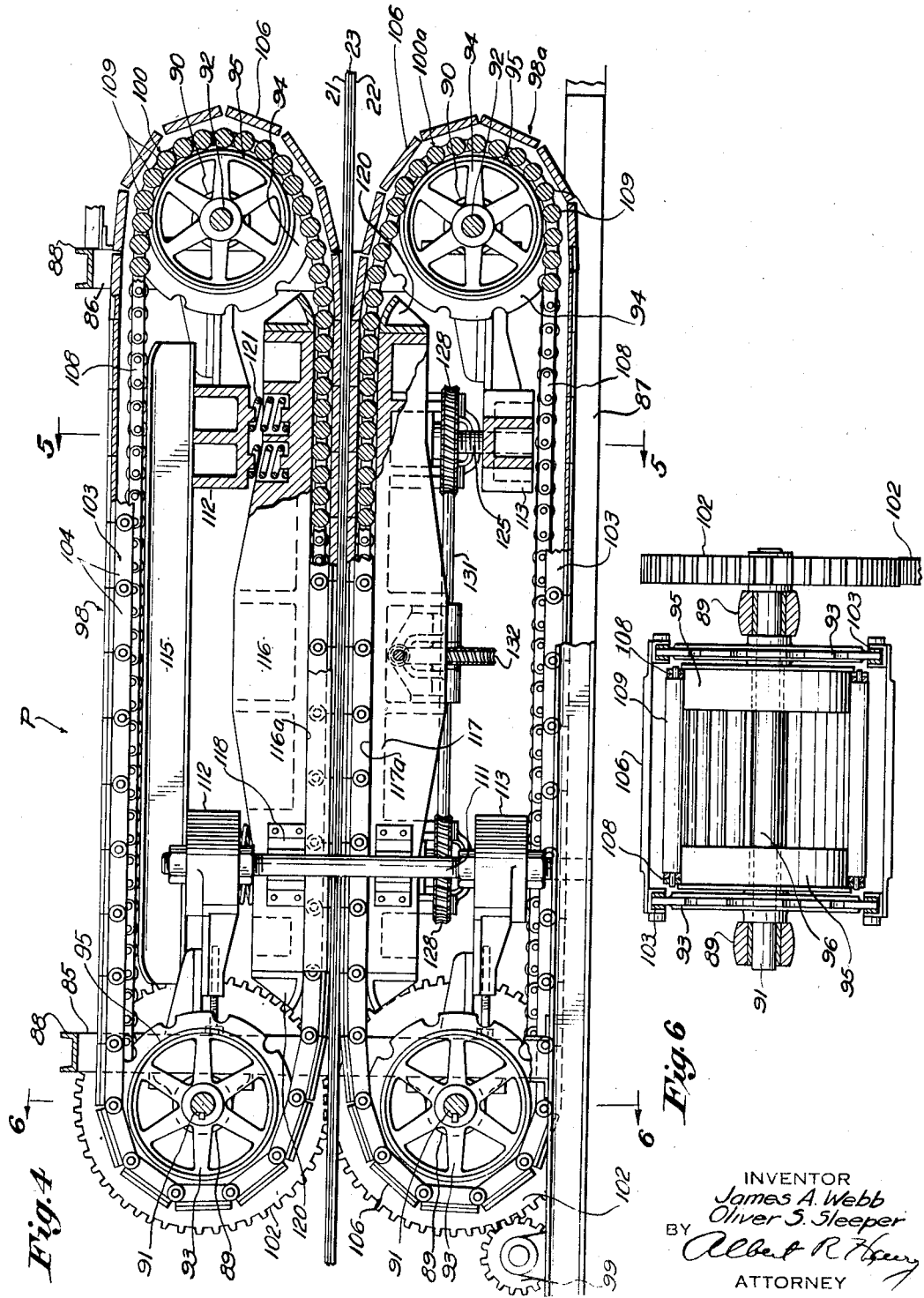
INVENTOR
James A. Webb
Oliver S. Sleeper
BY
Albert R. Heery
ATTORNEY

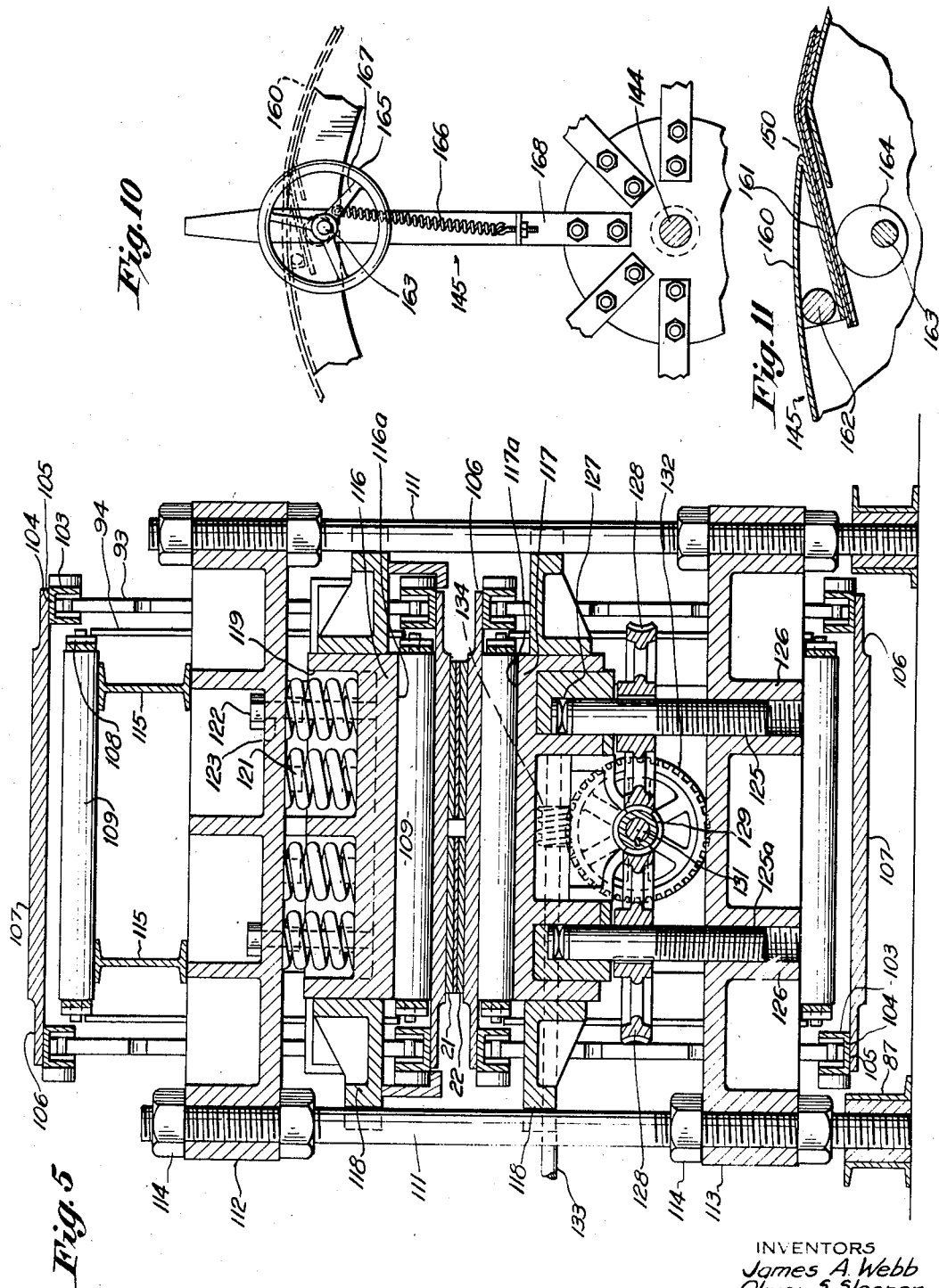

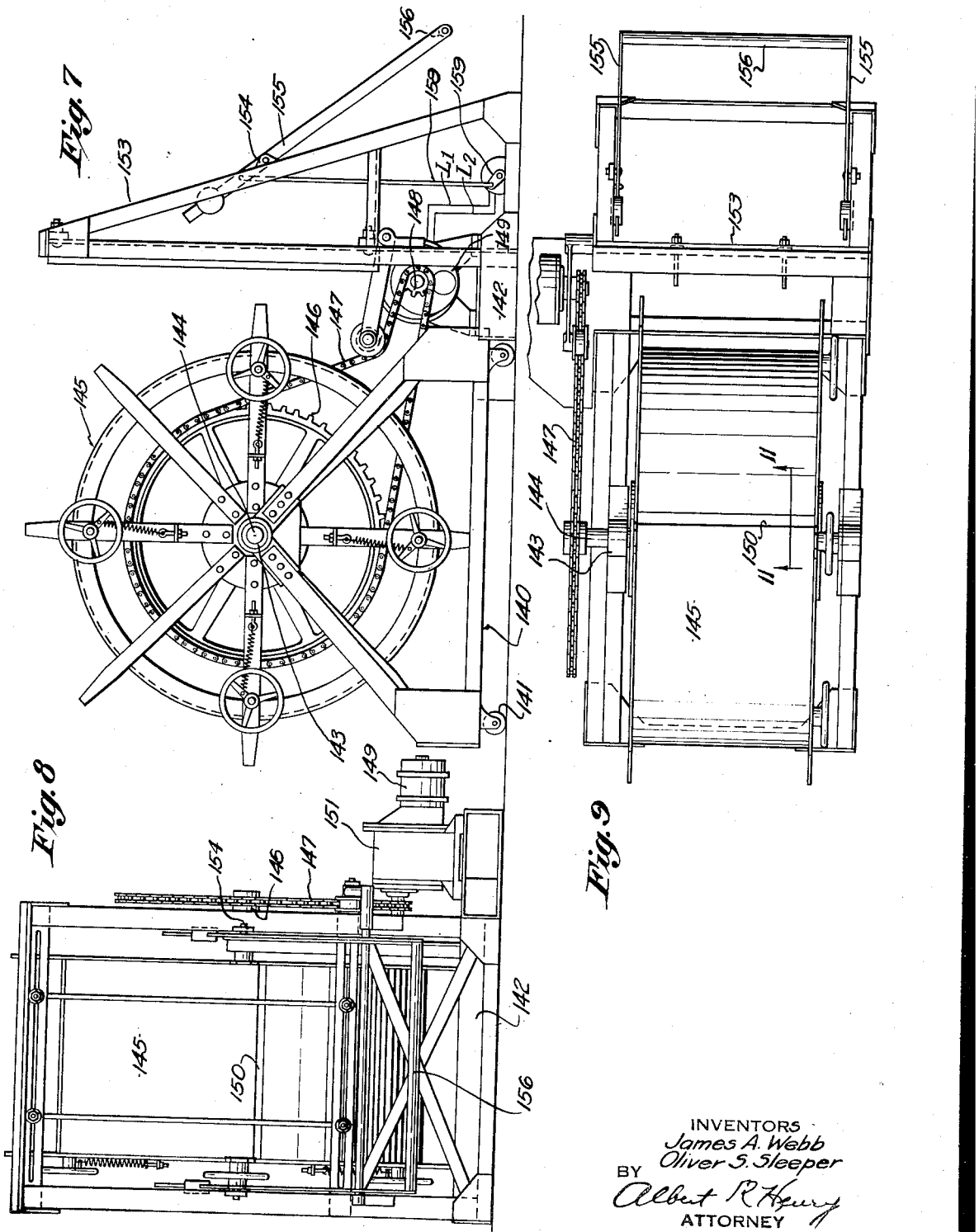

Patented Jan. 9, 1940

2,186,776

UNITED STATES PATENT OFFICE 2,186,776

BELT MAKING MACHINE

James A. Webb and Oliver S. Sleeper, Buffalo, N. Y., assignors to J. A. Webb Belting Co., Inc., Buffalo, N. Y.

Application August 19, 1937, Serial No. 159,929

10 Claims. (Cl. 154—3)

This invention relates to the manufacture of laminated belting, particularly multi-ply leather belting, and it is directed especially to a machine for making such belting in a rapid and effective manner.

Heretofore it has been proposed to superimpose plies of belt leather, with the interposition of a suitable cement therebetween, and to subject the assembly to pressure in a hydraulic press for such interval of time as would serve to secure the plies to each other. While this procedure is satisfactory, insofar as the quality of the product is concerned, it is open to the objection that the operation is intermittent, and thus the capacity of the machine is limited. It has also been proposed heretofore to attempt the continuous manufacture of belting, by drawing the plies between a number of spaced rollers, each pair of which was subjected to pressure. One major defect in this proposal is, however, that the application of pressure is localized to those portions of the belting directly between the rolls, resulting in some internal flow of the cement and thus limiting the adhesiveness between the plies.

According to the present invention, the advantages of continuous operation are secured concurrently with the advantages of uniform pressure application over the entire surface of the belting. These results are obtained, according to the principles of the illustrative machine hereinafter described, by providing a pair of spaced and movable platen or traction members, the areas of which are substantially plane or continuous throughout the working zone. In effect, these members are so arranged that, while pressure is applied to the belting, they are similar to the platens of the intermittent type of press, but are different in that they are constantly moving from the point of ply admission to the point of ply discharge.

Relatively stationary means are associated with the movable platens or traction members, through which the pressure applied to the belting may be made such value as is desired. Inasmuch as it would be difficult to move the tractor platens, under pressure, between a pair of fixed members, roller means are interposed between the platens and the pressure applying means, thus permitting the moving action desired.

In connection with the movable press itself, just outlined, the machine of the present invention includes means to mount the belt plies adjacent the admission end of the press; means to bring the plies in superimposed relation with a coating of cement therebetween; means to receive the pressed plies to permit of their drying; and means to wind up the finished belting; all of which means are so constructed and arranged as to adapt the machine to belting of various sizes. The nature of these means, and the advantages thereof, may be readily understood from the following description of a preferred embodiment of the machine, while the novel features of the invention will be pointed out in the appended claims.

In the drawings:

Fig. 1 is a perspective view of the machine wherein a pair of belts are being fabricated, cemented, pressed and reeled;

Fig. 2 is a side elevation on an enlarged scale of the feed and cementing units of the machine;

Fig. 3 is an enlarged section on the line 3—3 of Fig. 2 showing details of the cementing tank;

Fig. 4 is an enlarged side elevation of the continuous press with portions broken away to show the roll and platen structure;

Fig. 5 is an enlarged cross section through the press taken on the line 5—5 of Fig. 4;

Fig. 6 is a partial section on the line 6—6 of Fig. 4;

Fig. 7 is an enlarged side elevation of the reel;

Figs. 8 and 9 are end and top views thereof, respectively;

Fig. 10 is an enlarged fragmentary view of a portion of the reel showing the clamping mechanism; by Fig. 11 is an enlarged fragmentary section on the line 11—11 of Fig. 9.

The perspective view (Fig. 1) shows the general arrangement of the machine units, and beginning at the right hand side of this view it will be observed that supply rolls R of ply leather are positioned in a frame 20, and the plies 21 and 22 therefrom are directed horizontally and then vertically into superimposed position prior to entry into a continuous press P. A cementing unit C is disposed adjacent the press and it carries supply rolls of sheet cement S, the web 23 therefrom being drawn through a solvent bath during the operation of the machine and then interposed between the plies 21 and 22 at their point of juncture at the entrance into the press P. The joined plies are drawn through the press at a uniform speed and subjected to considerable pressure before being delivered to a drying table 24 and an automatic reel 25.

In the drawings, two belts are shown fabricated simultaneously in the machine, which, it will be understood, may be replaced by a wider single belt or a greater number of narrower belts.

The frame 20 (Fig. 2) is formed with a single pedestal 30 having blocks 31 to which projecting horizontal rods 32 are secured, which rods serve as mounting means for the supply rolls R. Vertical spacing bars 33 are positioned between and on the outer faces of the rolls R, and they are adjustably secured to opposed upper and lower projecting arms 34 and 35, forming part of the pedestal 30.

Spaced uprights 36, forming part of the frame structure, are connected at their upper ends to the pedestal arm 34 by tie bars 37, and to the frame of the press, which will be presently described, by struts 38. Pairs of horizontal bearings 39 are secured to the frame structure adjacent the upper and lower ends of the uprights 36, and they rotatably receive the pintles of guide rolls 41 and 42 about which are directed the plies 21 and 22. Similar pairs of bearings 40 are secured to the central portion of the uprights 36 for receiving closely spaced rolls 43 and 44, between which the plies are united and directed horizontally toward the press P. The vertical stretches of belting travelling from the rolls 41, 42 to the rolls 43, 44 pass between suitable guide bars 45 which are adjustably secured to transverse bars 46 on the uprights 36. At the delivery side of the rolls 43, 44, the united plies pass between a guide structure comprising spaced horizontal plates 48 which are mounted on a supporting structure 49.

The cementing unit C (Figs. 2 and 3) is partially supported on spaced horizontal angles 51 which are secured to the uprights 36 and to the pedestal structure 30. This unit includes a solvent tank 52 having an open top and an angular bottom formed by walls 53, 54. Brackets 55 are secured to the left hand end of the tank, and they are formed with bearing portions 56 which are rotatably mounted on the pintles 57 of the roll 44. This permits the tank to be raised or lowered with the pintles 57 as the pivot point.

A segment gear 58 is secured to the tank and it meshes with a pinion 59 whose shaft 61 is rotatably mounted in a suitable bearing in an angle member 62 secured to the top of one of the angles 51. The gear 58 is backed by a roller 60 carried by the angle 62. A crank 63 is carried by the shaft 61, and it is operable to raise or lower the tank about the pintles 57 to any desired position. A ratchet wheel 65, secured to the shaft 61, is engaged by a pawl 50 which, through the associated mechanism, retains the tank at any desired position.

A roll 64 is mounted in the tank adjacent the juncture of the bottom walls 53, 54 by means of bearings 65.

The tank 52 receives a displacement member 66 which comprises a hollow body shaped to conform with slight clearance to the inside dimensions of the tank. Hinge lugs 67 project from the left side of the member 66, and they are pivotally connected to the brackets 55 by a hinge pin 68 which projects through both the brackets and lugs. A transverse bar 69 is secured to the upper surface of the member 66 and it is formed with overhanging pintles 71 which normally rest on the edges of the tank, thus retaining the displacement member in a fixed position relative to the tank. Spaced projecting bearings are also secured to the surface of the member 66, and they receive a rod 72 which carries the rolls of sheet cement S.

A plurality of projecting fingers 73 are secured by bolts 74 to the right hand end of the tank 52, and they engage between the sheet cement rolls and retain them against lateral displacement.

The member 66 and accompanying rolls of sheet cement may be given other positions relative to the tank through an adjusting mechanism consisting of a segment gear 70 secured to one of the pintles 71, and a meshing pinion 75 which is mounted on a shaft 76 disposed in a suitable bearing in the angle member 62. A roller 77 secured to the angle 62 retains the gear in mesh with the pinion 75. The operation of a crank 78, secured to the shaft 79, permits the displacement member 66 to be swung about the hinge pin 68. A pin 81 which is inserted through a suitable hole in the angle member 62 and any one of a plurality of holes 82 in the gear 70, permits the gear to be fixed in any elevated position.

The sheet cement S is introduced into the tank 52 beneath the displacement member 66 and roll 64, and it emerges at the left hand end of the tank for application between the plies 21 and 22 as they are joined between the rolls 43, 44. As the plies are drawn toward the press, the sheet cement is carried therewith, and accordingly the sheet cement is continuously drawn through the solvent in the tank 52 at a uniform rate.

The displacement member 66 serves not only as a guide for retaining the web 23 of sheet cement positioned adjacent the bottom walls 53, 54 of the tank, but as a seal for the tank, since it permits but a small area of the volatile solvent to be exposed to the air.

The time interval during which the sheet cement is immersed in transit is controlled by adjusting the angularity of the tank relative to the horizontal through the described adjusting crank 63. As shown in Fig. 2, when the tank is in a horizontal position, a maximum length of cement is immersed below the solvent level. When the tank is given any other position, it will be obvious that, due to the angularity of the tank bottom, a lesser length of cement will be immersed. Thus, by properly positioning the tank, the time of immersion and the associated softening effect on the sheet cement may be accurately controlled.

The continuous press P (Figs. 1, 4, 5, 6) is provided with a frame which includes two pairs of columns 85 and 86, which project vertically from a base 87 and are tied at their top ends by transverse channels 88. Horizontal bearings 89 and 90 are secured to the columns 85 and 86, and they rotatably receive heavy shafts 91 and 92 respectively. Pairs of spaced sprockets 93 are keyed to the shafts 91, while similar sprockets 94 are rotatably mounted on the shafts 92. Idler pulleys 95, connected by a hollow shaft 96, are rotatably mounted on the shafts 91 and 92 (Fig. 6) between the sprocket pairs. Endless traction conveyors 98 and 98a are carried by the upper and lower sets of sprockets respectively, while the adjoining freely rotatable pulleys 95 support roller conveyors 100 and 100a, which, it will be observed, are disposed within the confines of the former conveyors. The conveyors 98 and 98a are operated in unison at a constant rate of speed, their shafts 91 being connected by gears 102 which are driven by a pinion 99, which in turn is connected to a suitable source of power (not shown).

The traction conveyors 98, 98a, each include a pair of endless chains 103 whose links 104 are formed with surfaces 105. Transverse bars 106, which together form the movable platen of the press, are secured at their extremities to the surfaces 105 of the opposed pairs of chains. The bars are formed with raised central pads 107 which contact the belting and which, if desired, may be surfaced with a suitable resilient material.

The roller conveyors 100, 100a are fabricated of pairs of chains 108 and closely spaced connecting transverse rollers 109 which, as will presently be apparent, serve as roller bearings for the tractor conveyors.

The pressure applying portion of the press consists of a guide structure including four vertical guide posts 111 whose lower ends are fixed in the base 87. The posts extend through suitable bosses in upper and lower pairs of yokes 112 and 113 which are rigidly secured thereto by nuts 114. The upper yokes are connected by longitudinally extending beams 115. Upper and lower platens 116, 117 are mounted in opposed relation on opposite sides of the juxtaposed lineal conveyor sections, both platens having slide bearings 118 attached thereto which engage the posts 111 for vertically guided movement. The upper platen 116 is formed with spring seats 119 for receiving heavy springs 121, whose upper ends bear against the overlying upper yokes 112. Adjusting screws 122 slidably engage through holes 123 in the upper yokes, and are threaded into the platen 116 to limit the lower position of the platen, with the springs 121 being thus retained under compression.

Curved guide pieces 120 are secured to the extremities of the platens 116 and 117 to permit smooth introduction of the rollers 109 of the conveyors 100, 100a between the platens, as will be hereinafter apparent.

The lower platen 117 is supported on an adjustable structure which permits the spacing between platens to be varied. This structure consists of four vertical adjusting screws 125, 125a having right and left hand threads respectively which engage in threaded bosses 126 in the lower yokes 113. The upper ends of the screws are received in thrust bearings 127 which are inserted in the platen 117. A worm wheel 128 is carried by each screw, and each adjoining pair of wheels meshes with a worm 129. The worms are secured to a longitudinal shaft 131, mounted in bearings in the yoke 113, and carrying at its central portion an adjusting worm wheel 132. An adjusting shaft 133 extends transversely through the platen 117, and an adjusting worm 134, which meshes with the wheel 132, is secured thereto.

The operation of a large handwheel 135 secured to the shaft 133 permits the four worm wheels 128 to be operated in unison and to turn the screws 125, 125a in their threaded bosses 126.

It will be observed that the parallel surfaces 116a, 117a of the platens are spaced sufficiently to permit the passage of the four juxtaposed lineal conveyor sections therebetween. The conveyors 98, 98a are operated with their platen bars 106 in direct opposition, while the conveyors 100, 100a are interposed between the platen bars 106 and the overlying and underlying platens 116 and 117 respectively, and thus, in effect, provide a large roller bearing whose rollers 109 engage planar races formed by the opposed platen and platen bar surfaces.

The opposed pads 107 of the platen bars 106 of the driven conveyors 98, 98a are sufficiently spaced, through the platen adjusting mechanism previously described, to receive the united belting plies 21, 22 from the cementing unit C. This spacing is adjusted so that it is less than the thickness of the belt in order that as the belt is drawn through the press it is compressed sufficiently to force the partially liquefied cement into the pores of the leather. Inasmuch as the belting is subjected to this uniform pressure during its course of travel through the pressure zone of the press which is defined by the fixed platens, sufficient time is allotted for the partially softened sheet cement first to bond the plies 21 and 22 and then to permit partial drying while under pressure.

Attention is directed to the articulated structure of the conveyor, where as the bars 106 enter the lineal path of travel they are brought into intimate contact with their pads 107 forming two planar surfaces, between which the belt is retained. The spacing of the rollers 109 of the conveyors 100, 100a is such that on the lineal section at least two rollers of each conveyor are in constant contact with the underlying bars 106, with the result that uniform pressures are maintained along the entire planar surface.

As the belting is delivered from the press P, it slides along the table 24 where further drying of the cement is permitted before the belts are reeled.

The reel mechanism, as shown in Figs. 7–11, consists of a carriage 140 mounted on wheels 141, which carriage is adapted to be positioned against a rail 142 in an immovable position when in operation. The carriage is formed with horizontal bearings 143 for receiving a shaft 144 to which is secured a reel 145 of large diameter. A sprocket 146 is secured to the shaft 144, and it is connected by a chain 147 to a small drive sprocket 148 which is operated by an electric motor 149 through a gear reducer unit 151.

To prevent tension from being applied to the belts as they are reeled, the operation of the motor 149 is controlled by a tension responsive device consisting of a frame 153 having opposed bearings 154 on which arms 155 are pivotally mounted. A roller 156 is secured to the extremities of the arms 155, and it rests on the belts as they are drawn from the table 24 to the reel.

A connecting rod 158, carried by one of the arms 155, is connected to a switch 159, which controls the circuit of the motor 149 through conventionally arranged connecting wires $L_1$ and $L_2$, as shown in Fig. 7.

In operation, the reel is geared to withdraw belting at a slightly greater speed than it is delivered by the press P. The belting thus slowly tends to draw taut, whereupon the roller 156 and accompanying arms 155 are elevated to a position where the connection 158 actuates the switch 159 to open the motor circuit. The belt then slowly sags, and when the following roller reaches a predetermined low point, the switch is then thrown to close the motor circuit.

In view of the fact that it may be desired to reel simultaneously a plurality of belts, the reel 145 is constructed with a plurality of clamping mechanisms for engaging the ends of the belts. As shown in Figs. 10 and 11, the rim 160 of the reel 145 is provided with spaced axial slots 150 for receiving the belting ends. A lip 161 of sheet metal borders one edge of each slot, and it is backed by a reinforcing bar 162 which is secured to the reel. A transverse shaft 163 is carried in suitable bearings in the reel adjacent each slot, and it is formed with an eccentric 164 which is adapted to clamp the belt end to the lip 161. A handwheel 165 is secured to each shaft 163, and a spring 166 is secured between one of the arms 167 of the handwheel and one of the reel arms 168, to continuously urge the handwheel and accompanying eccentric 164 into clamping engagement with the belt end.

From the foregoing description, it will be understood that the present invention provides a means for making belting rapidly in a continuous manner, with a well distributed application of pressure to the plies, as has heretofore been obtainable only with the intermittent platen type of press. The straight lengths of the tractor members, while constantly moving in a horizontal direction, nevertheless provide a pair of opposed plane surfaces through which pressure is applied normal to the surface of the belt plies. It is thus possible to effect a uniform application of pressure over the belting, and, at the same time, relieve the plies from the application of tension during the pressing operation. That is to say, since the plies are clamped between the tractor members, against which pressure is applied in a vertical direction, there is no force tending to stretch the belting lengthwise, which might result in ply separation.

Since the tractor members are power driven, no greater force need be applied to the belting, to deliver it to the press, than that required to overcome the resistance of the reels and like devices on the admission end of the machine, and, since the belting is wound up intermittently on the receiving reel, no stresses are developed on the discharge side of the press which would tend to impair the quality of the product.

While the invention has been described with reference to a single embodiment of a complete machine, it will be apparent that the details thereof are susceptible of numerous modifications without departure from the scope of the invention, and that various elements of the complete machine may be employed in other combinations or independently of the association herein set forth. It is therefore intended that the scope of the invention should be determined from the context of the following claims.

We claim:

1. A belt making machine comprising a press formed of a pair of endless tractor conveyors, drive means therefor, said conveyors having opposed lineal sections for contacting and drawing belting therebetween, pressure means for forcing the sections toward each other while in transit, means for guiding a plurality of belting plies into juxtaposition before entry into the press, and means for continuously applying cement to the plies prior to juxtaposition.

2. A belt making machine comprising a press formed of a pair of endless tractor conveyors, drive means therefor, said conveyors having opposed lineal sections for contacting and drawing belting therebetween, pressure means for forcing the sections toward each other while in transit, means for guiding a plurality of belting plies into juxtaposition before entry into the press, a reel at the delivery side of the conveyors, a separate drive for the reel, and tension responsive means for controlling the operation of said drive.

3. A belt making machine comprising a press formed of a pair of endless tractor conveyors, drive means therefor, said conveyors having opposed lineal sections for contacting and drawing belting therebetween, platens disposed in opposed relation on opposite sides of said sections, pressure means associated with the platens for urging the platens toward each other, anti-friction means disposed between the sections and the adjacent platens, means for guiding a plurality of belting plies into juxtaposition before entry into the press, and means for continuously applying cement to the plies prior to juxtaposition.

4. A belt making machine comprising a continuous press formed of a pair of endless tractor conveyors, drive means therefor, said conveyors having opposed lineal sections for contacting and drawing belting therebetween, platens disposed in opposed relation on opposite sides of said sections, resilient means for urging one of the platens to a fixed position, adjusting means for the remaining platen for moving it to a fixed position relative to the first platen, anti-friction means disposed between the sections and the platens, means for guiding a plurality of belting plies into juxtaposition before entry into the press, and means for continuously applying cement to the plies prior to juxtaposition.

5. A belt making machine comprising a continuous press for drawing belting therethrough, drive means for operating the press at a constant speed, means for guiding a plurality of belting plies into juxtaposition before entry into the press, means for softening sheet cement and means for introducing the softened sheet cement between the belting plies, said softening means comprising a tank containing liquid solvent through which the sheet cement is drawn, and means for guiding the cement through the tank, said means being adjustable to vary the length of sheet cement in the liquid solvent and thereby the time of immersion.

6. A belt making machine comprising a continuous press for drawing belting therethrough, drive means for operating the press at a constant speed, means for guiding a plurality of belting plies into juxtaposition before entry into the press, means for softening sheet cement and means for introducing the softened sheet cement between the belting plies, said softening means comprising a tank containing liquid solvent, said tank having an angular bottom, means for guiding the cement along the bottom, and mounting means for the tank including adjustable means for tilting the tank to vary the length of sheet cement in the solvent and thereby the time of immersion.

7. A belt making machine comprising a continuous press for drawing belting therethrough, drive means for operating the press at a constant speed, means for guiding a plurality of belting plies into juxtaposition before entry into the press, means for softening sheet cement and means for introducing the softened sheet cement between the belting plies, said softening means comprising a tank containing liquid solvent through which the sheet cement is drawn, means for guiding cement through lower portions of the tank, and a displacement member immersed in the tank and covering a major portion of the surface area of the tank to prevent evaporation of the solvent and thereby control the extent of softening.

8. A belt making machine comprising a continuous press formed of a pair of endless tractor conveyors, drive means therefor, said conveyors having opposed lineal sections for contacting and drawing belting therebetween, relatively fixed platens disposed in opposed relation on opposite sides of said sections, endless chains having a plurality of transverse rollers, pulley means for mounting a chain within the confines of each conveyor, the rollers of said chains being disposed to enter between said sections and fixed platens to provide anti-friction means for the conveyors, means for guiding a plurality of belting plies into juxtaposition before entry into the press, and means for continuously applying cement to the plies prior to juxtaposition.

9. In a belt making machine, the combination with means for supplying superimposed belt plies intended to be secured together by pressure, of means for applying uniform pressure normally only to the surfaces of said plies while said plies are in motion, said pressure applying means comprising a pair of endless tractor members having spaced parallel lineal stretches, pairs of uniformly spaced sprocket members adapted to support said tractor members, means for positively driving said members concurrently through one pair of sprocket members disposed at the discharge end of said machine, pressure platens disposed between said sprockets and adapted to exert normal pressure only on each of said tractor stretches to press the same into juxtaposition, and idler roller means interposed between said platens and said stretches to permit lineal movement of said tractor members with respect to said platens.

10. In a continuous belt making machine wherein a pair of superimposed and cemented belt plies are integrated by means of normal pressure only while said plies are in motion, the combination with means for laying up the plies with a coating of cement therebetween of means for applying normal pressure to said plies, said pressure applying means comprising pairs of spaced upright frame members, pairs of uniformly spaced sprocket members mounted on each of said pairs of upright members, continuous articulated tractor members disposed about said spaced sprocket members in slightly spaced parallel relation to provide a lineal stretch through which the plies may pass, means at one end of the tractor members for supplying the plies therebetween, means connected to the sprocket members at the opposite end for positively driving said members, continuous roller conveyors disposed within the confines of said tractor members and adapted to contact said members throughout said lineal stretch, pressure platens mounted above and below said lineal stretch in contact with said roller conveyors to supply pressure to opposite sides of said stretch, and means for adjusting the pressure exerted by said platens in a direction normal to said stretch.

JAMES A. WEBB.
OLIVER S. SLEEPER.